United States Patent

Pierpont, Jr.

[15] 3,661,670
[45] May 9, 1972

[54] METHOD OF FORMING FIBER GLASS PIPE WITH INTEGRAL JOINT THREAD

[72] Inventor: William H. Pierpont, Jr., Wichita, Kans.
[73] Assignee: Koch Industries, Inc., Wichita, Kans.
[22] Filed: Sept. 15, 1969
[21] Appl. No.: 870,965

Related U.S. Application Data

[62] Division of Ser. No. 763,564, Sept. 30, 1968, Pat. No. 3,495,627.

[52] U.S. Cl............................156/172, 138/109, 156/175, 156/245, 156/293, 156/296
[51] Int. Cl.......................................................B65h 81/00
[58] Field of Search..................156/169, 172, 175, 293, 191, 156/296, 245; 138/109; 285/423, 390

[56] References Cited

UNITED STATES PATENTS

| | | |
|---|---|---|
| 3,293,860 | 12/1966 | Stedfeld....................156/173 X |
| 2,876,154 | 3/1959 | Usab........................138/100 X |
| 3,047,191 | 7/1962 | Young......................156/173 UX |
| 3,381,716 | 5/1968 | Michael....................285/423 X |
| 3,412,891 | 11/1968 | Bastone et al..............156/171 X |
| 3,462,175 | 8/1969 | Johnson....................156/169 X |
| 3,495,627 | 2/1970 | Pierpont, Jr...............156/155 X |

Primary Examiner—Benjamin R. Padgett
Assistant Examiner—E. E. Lehmann
Attorney—Richard C. Crowley, Philip G. Kiely and Richard L. Stevens

[57] ABSTRACT

Glass reinforced plastic pipe having preformed threads integrally disposed therein formed by: (1) molding threaded portions wherein the outer surface is preferably corrugated or irregular and which tapers down to the inside diameter of the pipe to which the thread is to be attached; (2) mounting said molded thread on the end of a mandrel; and (3) forming a pipe on said mandrel by providing pretensioned filamentous reinforcements longitudinally and helically disposed thereon and imbedded in a cured resin. The described tapered portion and corrugated portion of the thread is overwound with the above-mentioned helical and longitudinal filamentous material.

8 Claims, 5 Drawing Figures

Patented May 9, 1972

INVENTOR
WILLIAM H. PIERPONT, JR.

Richard P. Crawley
ATTORNEYS

INVENTOR.
WILLIAM H. PIERPONT, JR.

ATTORNEYS

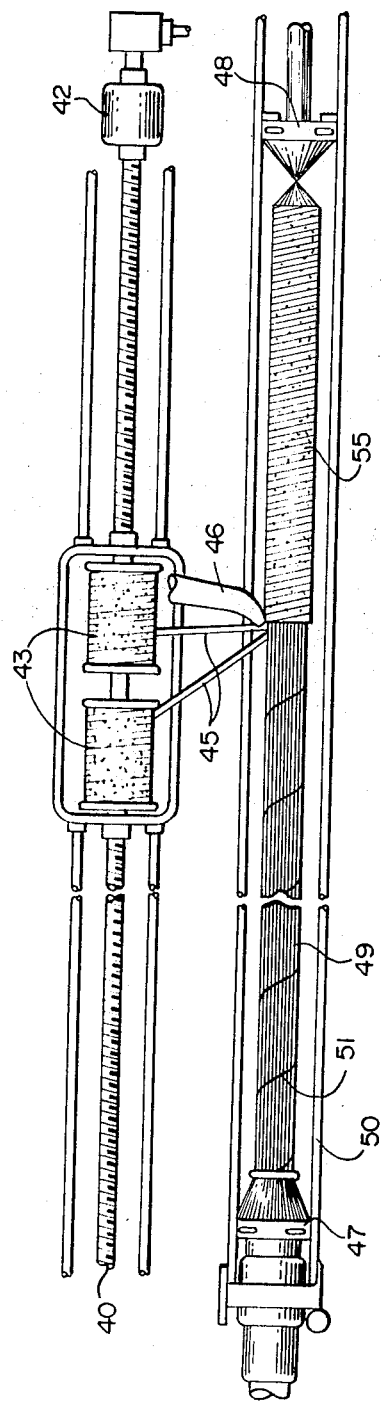

METHOD OF FORMING FIBER GLASS PIPE WITH INTEGRAL JOINT THREAD

CROSS-REFERENCE TO RELATED APPLICATION

This application is a divisional application of Ser. No. 763,564, filed Sept. 30, 1968, now U.S. Pat. No. 3,495,627.

BACKGROUND OF THE INVENTION

This invention relates to glass reinforced resin pipe and more particularly to reinforced resin pipe having premolded threaded end portions integrally attached thereto.

Resin pipe reinforced with glass filamentous material is well known to the art and possesses a number of advantages over metal pipe, e.g., inertness, low weight, corrosive resistance, and high strength. These properties make such pipes particularly suitable for use in the chemical processing industry and in the oil industry for use as line pipe, downhole tubing, etc.

Threaded end portions of glass reinforced resin pipes have been formed by a number of methods. One method employed the use of discrete coupling members for joining threaded adjacent ends of resin or plastic pipe. However, since two threaded ends of pipe are joined by an interposed connector, the possibility for leakage is doubled. In addition, the time and effort necessary for assembly is increased as well as the possibility for damage during assembly.

The use of threaded end portions is a considerable improvement over the employment of discrete coupling members; however, the formation of threaded end portions simultaneously with the formation of the pipe by virtue of a threaded nipple-like member over the end portion of the rotatable mandrel is also subject to some disadvantages. For example, care must be taken to avoid the entrapment of air in the resin in the formation of the threads and to assure uniform and complete filling of the threads. Thus, an extra step is introduced into the formation of the pipe. The application of release agents to the threaded nipple end must also be carefully applied to insure a good release of the thread and further, to prevent any damage to the threads when the finished pipe is removed from the mandrel.

Another method involved scribing grooves in a finished pipe to form threads therein. However, this method is extremely tedious and resulted in a high rejection rate of the threads by virtue of broken threads and exposed fiberglass strands. If threads are improperly formed and must be rejected, this cannot be discovered until the entire pipe has been formed and removed from the mandrel.

A novel method has now been found for forming glass reinforced resin pipe having threaded end portions which possess significant advantages over prior art pipe and methods for forming same.

SUMMARY OF THE INVENTION

The glass reinforced resin pipe of the present invention is composed of a cured resin and tensioned strands of longitudinal and helical glass filaments arranged generally parallel and transversely, respectively, to the longitudinal axis of the pipe with performed threaded end portions bonded to said pipe by virtue of overwinding at least a portion of the outer surface of the premolded thread which has been treated to provide good bonding to said resin and said filament windings.

The thread is premolded, for example, in conventional compression molding equipment, using an appropriate thermoset resin. The particular resin employed is not critical nor is the employment of specific fillers or reinforcing material therein. The particular composition of the molding material for the formation of the thread is selected for the specific end use to which the pipe is to be used.

The thread, which may be either male or female, is preferably constructed so that the back portion tapers down to a dimension substantially the same as the inside diameter of the pipe to which it will be attached. Preferably, the outside surface of the thread or at least a portion thereof, is irregular, i.e., corrugated, scored, or treated by other suitable means to provide the maximum of adhesion and mechanical locking of the resin and the filament winding material thereto.

The preferred method of treating the outer wall includes the formation of corrugations or striations in the outer wall. It should be understood, however, that the irregular surface may be prepared by any method which would provide the desired roughened exterior. For example, in addition to providing the desired surface condition during molding the already molded thread may be abraded or etched or granular material may be attached thereto by by adhesive. The purpose of the irregular structure of the outer wall of the premolded thread, however, is to provide greater adhesion between the premolded thread and the resin saturated glass roving.

The premolded threads are then placed at the ends of a mandrel of conventional winding apparatus and the pipe is formed employing longitudinal and helically wound strands of fiberglass imbedded in resin. The tapering portion of the thread structure is overwound with the helical and longitudinal windings thus providing a threaded portion bonded in place by virtue of the curd resin and mechanically locked in place by virtue of the glass filament windings thereon.

Thus, the novel pipe of the present invention would not be subject to rejection by virtue of improperly formed threads applied thereon since defective threads would be rejected prior to the formation of the pipe. The selection of materials for the formation of the thread is much broader since the full range of compression molding materials can be employed in preforming the thread whereas many materials could not be used for in situ formation of threads during the manufacture of the pipe. By the proper selection of the compression molding material, the threads, therefore, can possess a harder and smoother surface than that which is now obtainable in threaded reinforced glass pipe. The employment of preformed thread also provides for greater ease of manufacture of the pipe in that the removal of the pipe from the mandrel does not require rotation of the pipe to remove the thread from the forming mold, as would be necessary with an in situ formed thread.

BRIEF DESCRIPTION OF THE DRAWINGS

FIG. 5 is a fragmentary plan view of an apparatus employed in making glass reinforced resin pipe.

DETAILED DESCRIPTION

Figure 1:
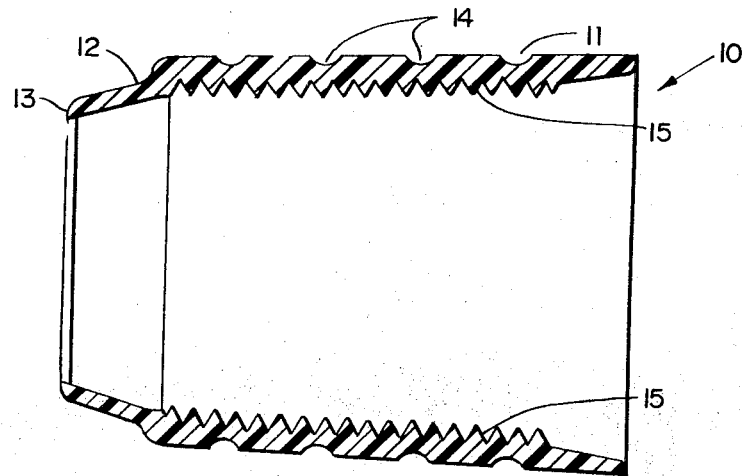
FIG. 1 is a fragmentary sectional view illustrating a premolded female thread prior to the bonding of said thread to a glass reinforced resin pipe.

Referring now to the drawings, in FIG. 1 is shown female premolded thread construction 10, the inner walls comprising threaded portion 15. The outer wall of the molded thread, adjacent end 13 which would abut the pipe to which it is to be attached comprises a tapered portion 12 which tapers to the inside dimension of the pipe to which it is to be bonded. Outer wall portion 11 comprises corrugations or striations 14 which provide maximum adhesion to the resin and the glass filaments.

Figure 2:
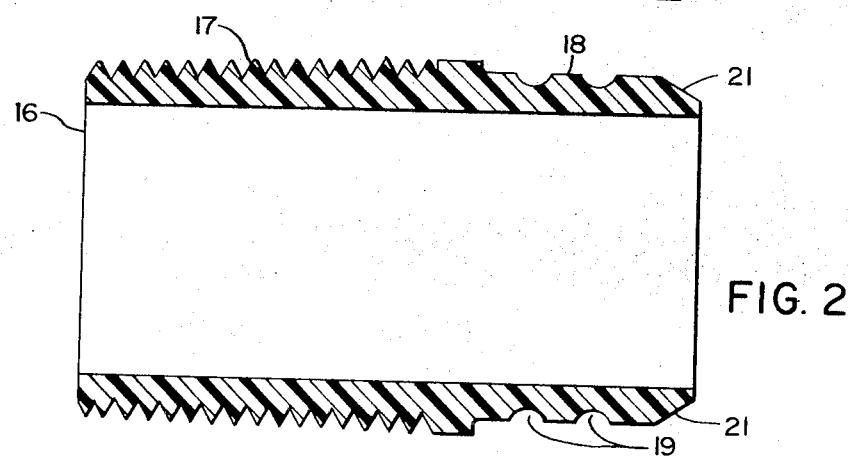
FIG. 2 is a fragmentary sectional view illustrating a premolded male thread prior to the bonding of said thread to a glass reinforced resin pipe.

FIG. 2 illustrates a male molded thread 16 wherein the forward portion of the outer wall is composed of a threaded portion 17 and the rearward portion of wall 18 includes corrugations or striations 19, The trailing end of the outer wall 21 tapers to a dimension intermediate the wall thickness of the finished pipe of the pipe to which it is to be bonded.

The pipe with the premolded thread integrally attached thereto is formed in accordance with conventional methods, for example, in accordance with the method disclosed in U.S. Pat. No. 3,202,560, issued Aug. 24, 1965. The body of the pipe is composed of alternate layers of longitudinal and helical glass filaments imbedded in a cured resin, preferably an epoxy resin. The resulting pipe is noted for its high tensile and burst strengths as well as corrosion resistance which, by virtue of the present invention, now possesses superior characteristics with respect to the threaded end portions thereof.

The premolded female threads are inserted on the end of mandrels generally employed in the construction of reinforced fiberglass pipe, for example, the lathe type apparatus schematically shown in FIG. 5. A suitable means for mounting the molded thread portions on the end of the mandrel are employed including preferably an insert in the thread itself to center the molded thread on the mandrel. The mandrel itself is then coated with a parting layer, such as paraffin (see for Example U.S. Pat. No. 3,231,442), or some other suitable parting compound to prevent the adhesion of the resin, as it cures, to the mandrel and to provide easy removal of the finished cured pipe from the mandrel. The pipe is then prepared by building up to the desired thickness in the manner disclosed in U.S. Pat. Nos. 3,202,560, and 3,231,442 by applying alternate layers of longitudinally arranged and spirally wound glass roving.

The male thread is preferably inserted over the outside of a partially formed pipe and then overwound with sufficient additional layers of filamentous material to provide the necessary strength. Alternatively, the male thread is selected having a dimension slightly larger than the finished pipe and the necessary overwinding is carried out only over the thread and a sufficient length of the pipe to provide the necessary strength.

Preferably, the glass filaments are an untwisted relationship. It is also preferred that the glass filaments be arranged substantially transversely to the mandrel longitudinal axis in the spiral helices and arranged parallel to the mandrel longitudinal axis in the longitudinal assemblages. Thus, any tensile or bursting forces imparted to the pipe may be reacted to efficiently by the individual filaments of the glass reinforcement. Preferably, the initial glass filament layer applied to the mandrel surface including the corrugated outer wall portion of the molded thread comprises a longitudinal assemblage or sock of glass roving. The glass strands of said assemblage are arranged parallel to the longitudinal axis of the mandrel. The pipe is then built up of alternating longitudinal and helically wound glass roving imbedded in a matrix of resin wherein the filaments are tensioned so that when the final thread pipe is employed, these tension forces may be utilized in resisting destructive forces which may be applied to the pipe.

The number of alternating layers of filaments is not critical but is determined by the operator depending upon the desired strength and the application of the finished pipe.

It should be understood that while the preferred arrangement of the filaments is parallel to the longitudinal axis of the pipe, that the longitudinal filamentary layers may be disposed at an angle to the longitudinal axis, e.g., at a 5° to 20° angle to the longitudinal axis. In still another alternative, the layers of filaments are arranged in a single angle to the longitudinal axis of the pipe. Preferably, the angle ranges from 45° to 85°.

Turning now to FIG. 5, a longitudinal strand assemblage 49 is placed under tension by means, for example, of a locking ring 47. A spiral wrap of glass roving 51 in widely spaced helices is wound about the longitudinal assemblage 49 to provide good contact with the mandrel surface. Platform 44 is reciprocally movable along the length of the adjacent rotating mandrel by means of rotating screw 40 which is driven by the reversible motor 42. Mounted on platform 44 are two or more spools 43 of glass roving which are controlled so as not to rotate until a predetermined torque is applied thereto. Glass roving strands 45 are fed from spools 43 and helically wound around the rotating mandrel and overlying strand assemblage 49 so as to form a layer 55. Simultaneously, with the wrapping of the glass roving, resin is deposited thereon through resin dispensor 46, which serves to saturate the glass roving. The sequential application of longitudinal and helical layers of glass roving is continued until a predetermined wall thickness of the pipe is achieved. At this point, the premolded male thread is fitted over the end into place. Then additional layers of filamentary material is applied to obtain the desired wall thickness and secure the thread to the pipe.

Figure 3:
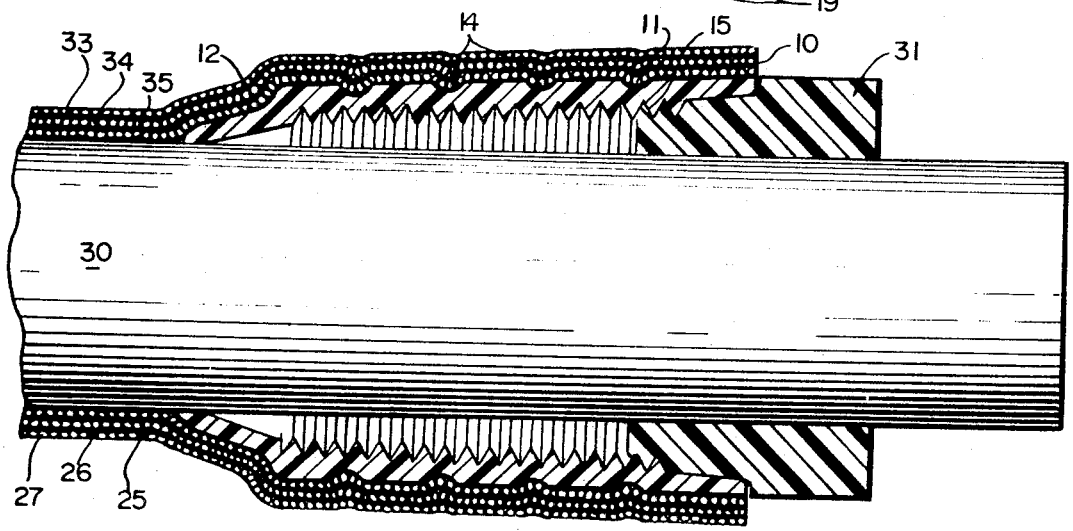
FIG. 3 is a fragmentary sectional view of a premolded female thread integrally secured to a resin reinforced pipe on a mandrel in assembled relationship.
Figure 4:
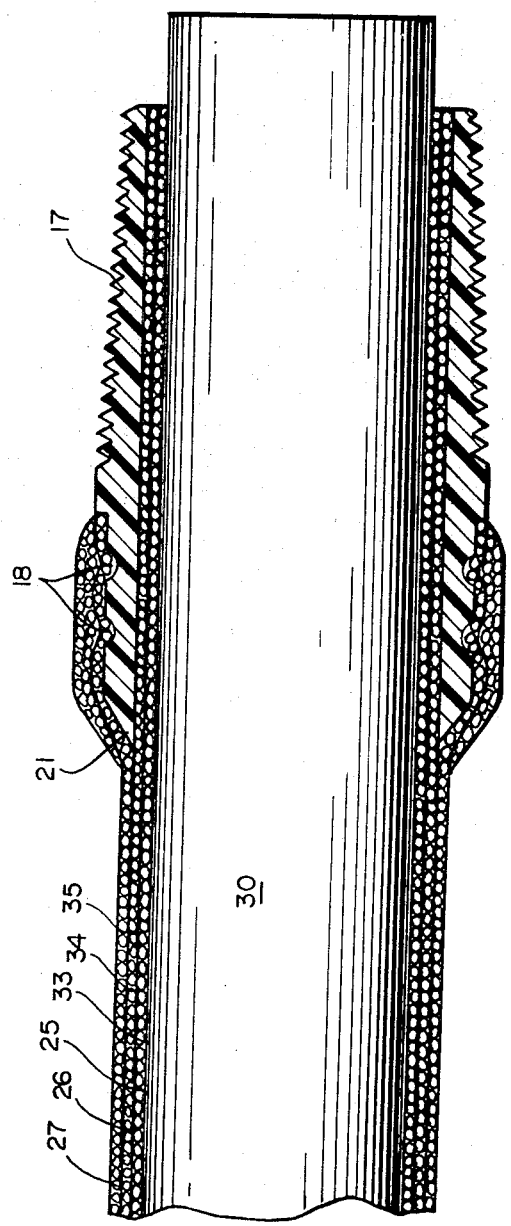
FIG. 4 is a fragmentary sectional view of a premolded male thread integrally secured to a resin reinforced pipe similar to the view of FIG. 3.

FIGS. 3 and 4 illustrate the simultaneous formation of the pipe with the integration of the premolded thread thereon. In FIG. 3, premolded female thread 10 is mounted on the end of mandrel 30 and centered in position by insert 31 which releasably engages the threads 15. The above-described pipe formation process provides alternating layers of longitudinal glass roving 25, 26, and 27 with helically wound strands 33, 34, and 35. The corrugations 14 in outer wall 11 provide receptacles for the applied strands of glass roving and resin which grips the threaded structure thus providing the maximum strength, bonding the premolded thread to the thusformed pipe. Insert 31 may comprise any suitable material, e.g., metal, wood, or plastic. Any means may be employed to remove the inserts after the manufacture of the pipe, e.g., dissolving, smashing, etc. In a particularly preferred embodiment, the inserts are composed of foamed plastic.

In FIG. 4, the molded male thread of FIG. 2 is shown in integral relationship to the pipe. Molded thread 16 is inserted onto the partially formed pipe on mandrel 30 wherein the pipe is only composed of filamentary layers 25, 26, 33, and 34. The application of the remaining filaments and resin is then continued to secure the thread to the pipe.

After the application of the alternate layers of the longitudinal and helical glass roving embedded in cured resin is complete, the resin is then cured by appropriate means; i.e., a self curing resin may be employed or external curing conditions are applied to the pipe such as heat or application of a curing agent. The pipe is then removed from the mandrel. Any remaining parting compound adhering to the interior of the pipe is then removed.

The composition employed in forming the premolded threads is not critical. Any suitable thermoset resin can be employed and, as stated above, the particular composition which will produce the desired hardness, corrosion resistance, tensile, etc., can be preselected depending upon the particular end use of the pipe into which it is to be incorporated. It is particularly preferred that the molding composition contain a filler. Particularly preferred is the incorporation of relatively short glass fibers or fibers of a suitable synthetic resin into the molding composition to provide enhanced strength to the molded thread structure.

Epoxy resins are preferred for saturating the filaments of the present invention and for molding the threads. The term "epoxy," as used herein, denotes the resinous reaction product of certain epoxide compounds and compounds having available hydrogen atoms linked to carbon atoms by oxygen atoms, as, for example, polyhydric phenols and polyhydric alcohols. A particularly useful epoxy resin is the reaction product of an epihalohydrin and a polyhydric phenol, as exemplified by bisphenol-epichlorohydrin. Suitable epoxy resins include the reaction products of epihalohydrins and a polyhydric alcohol such as ethylene glycol, propylene glycol, trimethylene glycol and the like. Other equivalent epoxy resins are well known to those skilled in the plastics art.

Other suitable resins include polyester resins, and, in particular, the alkyd resins comprising the reaction product or copolymers of polyhydric alcohols and dibasic acids. Typical of the large number of available polyester resins are the copolymers of phthalic anhydride and a polyhydric alcohol such as ethylene glycol, diethylene glycol or glycerine, maleic anhydride and a polyhydric alcohol, sebacic acid and a polyhydric alcohol, and diethylene glycol and bis-allyl carbonate. These and equivalent polyester resins are advantageously partially polymerized prior to their incorporation in the plastics composition, and may be modified in the manner known in the art by the admixture therewith of such modifiers as epoxidized oils and unsaturated fatty acids. If desired, suitable polyester polymerization catalysts well known to the art may also be included in composition.

Other polymers that can be employed include the acrylic compounds, and the phenol formaldehyde, furfural formaldehyde, and resorcinol-formaldehyde resins. Moreover, the saturating material need not be in every case what is commonly and rather loosely known as a "resin." For example, substances such as phthalic anhydride and diallyl phthalate may be employed as a thermosetting reactive material in the plastic composition.

The method employed in forming the pre-molded threads is conventional. Molding material is placed in a mold corresponding to the desired male or female thread desired and heat and pressure are applied to effect the formation of the premolded thread and to cure the resin molding composition.

I claim:

1. A method for forming a glass reinforced resin pipe having a first threaded end portion which comprises:
    a. premolding a threaded end portion, the outer surface of which tapers inwardly in a rearward direction toward the center axis of the pipe to be formed;
    b. applying a plurality of layers of glass roving imbedded in a resin to a rotatable mandrel to form partially a pipe;
    c. placing the premolded threaded end portion over the partially formed wall of the pipe, the pipe and premolded threaded end portion having a common center line;
    d. applying concurrently the roving to the mandrel and the premolded portion,
        i. completing the formation of the pipe while
        ii. bonding integrally to the pipe by applying said roving to the premolded threaded end portion;
    e. curing said resin; and
    f. removing the thus formed pipe with the threaded end portion from the mandrel.

2. A method for forming a glass reinforced resin pipe having a first threaded end portion which comprises:
    a. premolding a threaded end portion, the outer surface of which tapers inwardly in a rearward direction toward the center axis of the pipe to be formed;
    b. applying a plurality of layers of glass roving imbedded in a resin to a rotatable mandrel to form partially a pipe;
    c. placing the premolded threaded end portion adjacent to the end of the wall of the premolded pipe, the premolded portion and partially formed pipe having a common center line;
    d. applying concurrently the roving to the mandrel and the premolded portion,
        i. completing the formation of the pipe while
        ii. bonding integrally to the pipe by applying said roving to the premolded threaded end portion;
    e. curing said resin; and
    f. removing the thus formed pipe with the threaded end portion from the mandrel.

3. The method of claim 1 which includes applying said layers as alternate layers of longitudinal and helical glass roving.

4. The method as defined in claim 1 wherein said premolded threaded end portion carries irregularities in at least a portion of the outer wall thereof.

5. The method as defined in claim 1 wherein said premolded threaded end portion contains a tapered portion in the outer wall adjacent to the body of said pipe.

6. The method as defined in claim 2 which includes applying said layers as alternate layers of longitudinal and helical glass roving.

7. The method as defined in claim 2 wherein said premolded threaded end portion carries irregularities in at least a portion of the outer wall thereof.

8. The method as defined in claim 2 wherein said premolded threaded end portion contains a tapered portion in the outer wall adjacent to the body of said pipe.

* * * * *